Jan. 7, 1969 A. M. BICKFORD 3,420,232
ANESTHETIC VAPORIZER
Filed July 20, 1965 Sheet 1 of 6

INVENTOR.
ALLAN M. BICKFORD
BY
Albert M. Parker
ATTORNEY

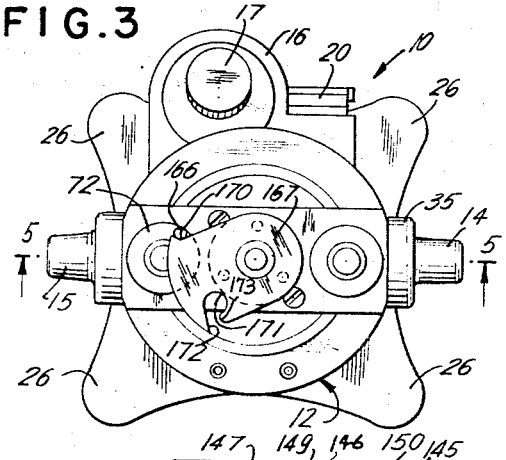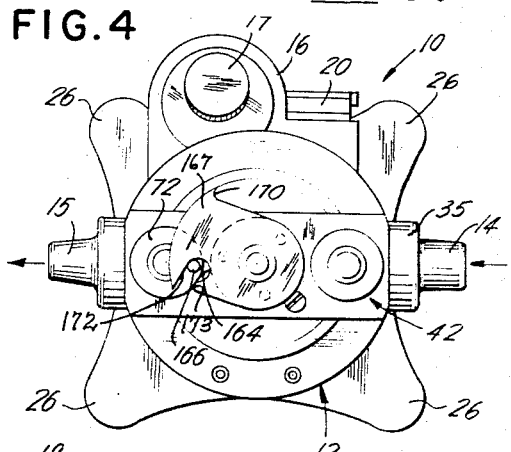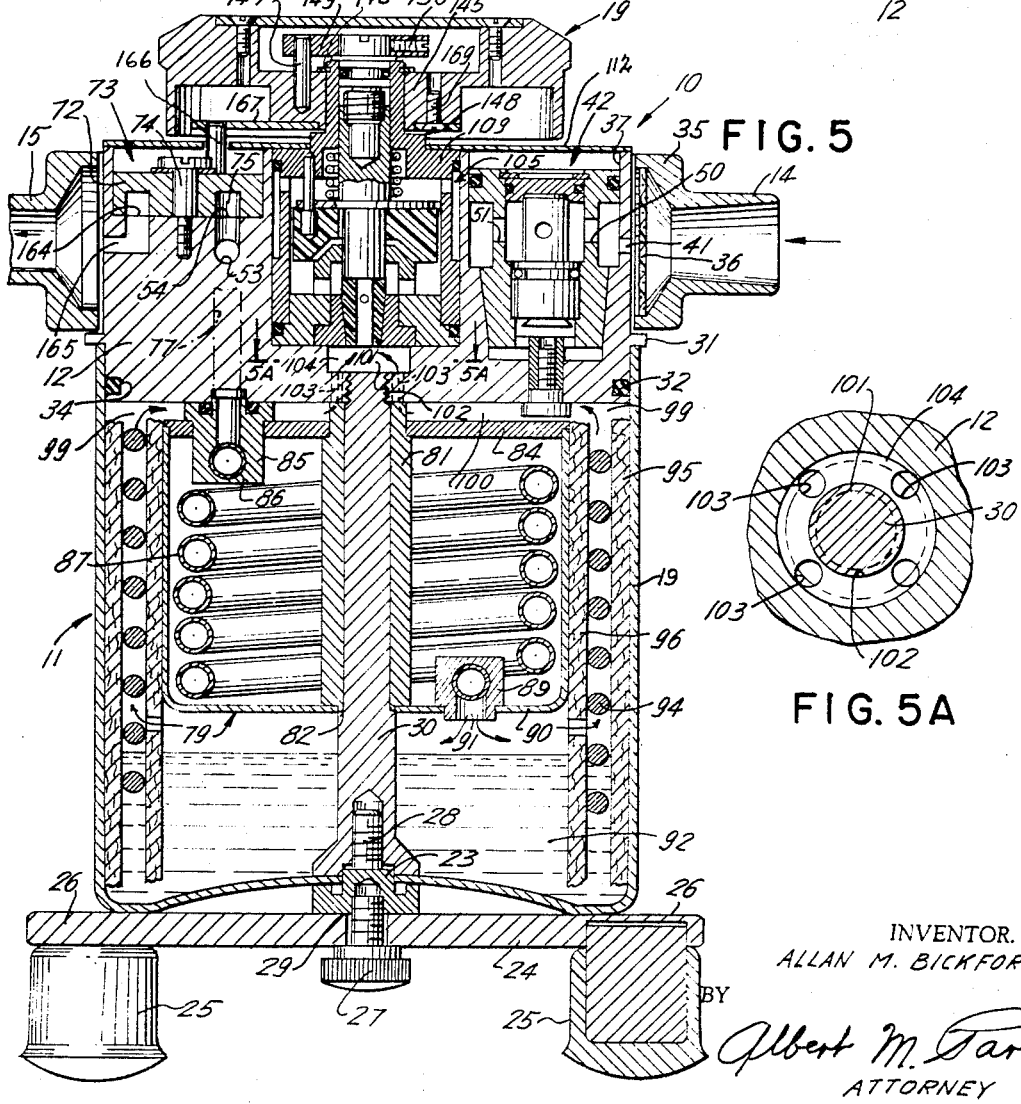

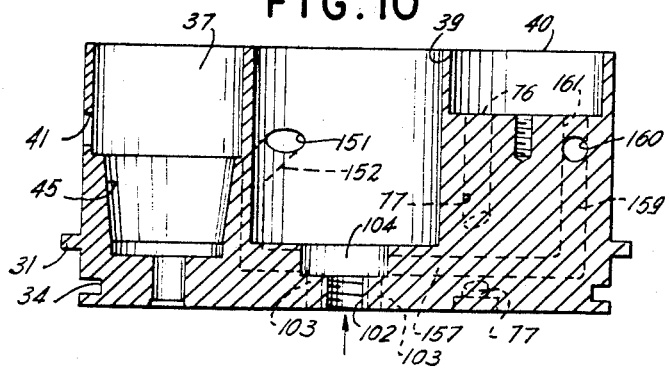
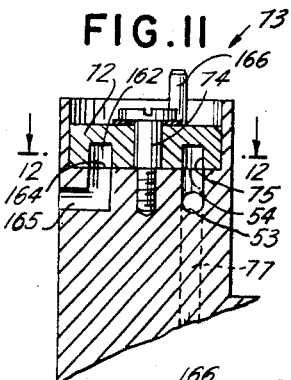
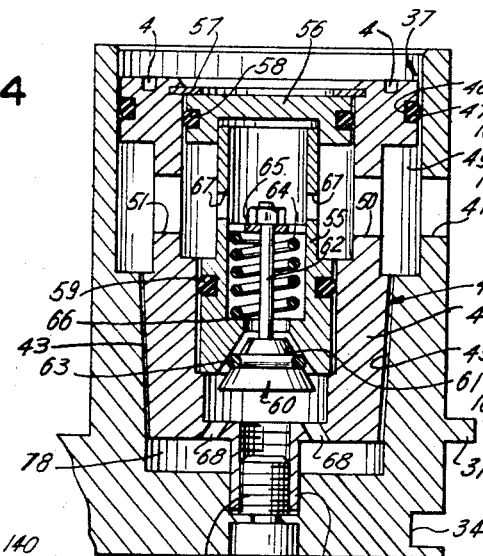
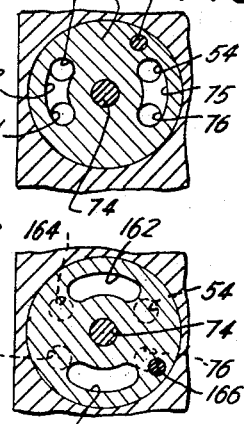
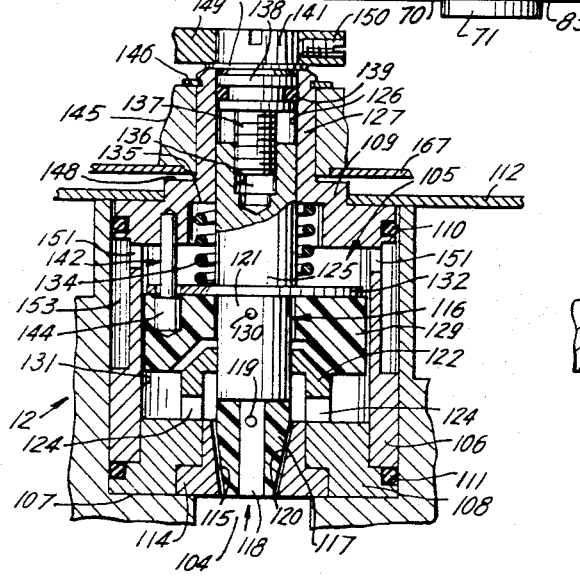
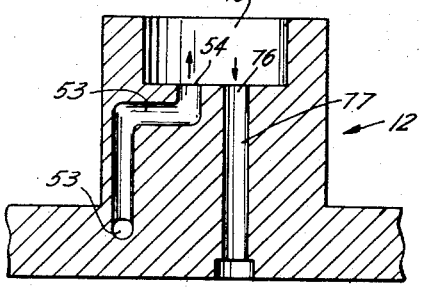

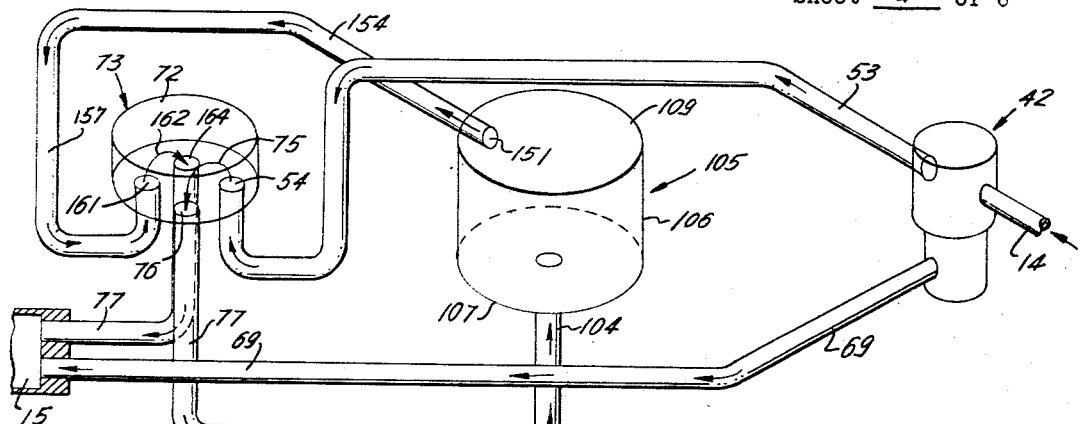
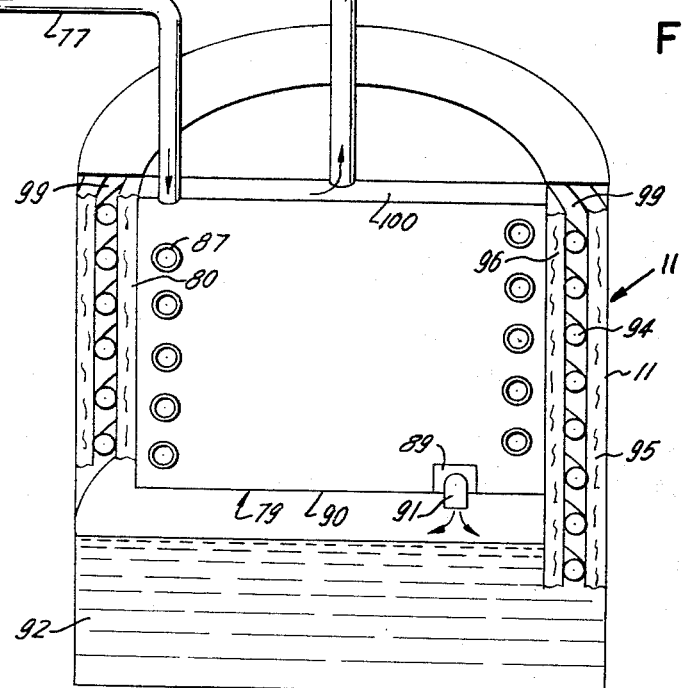
FIG. 17
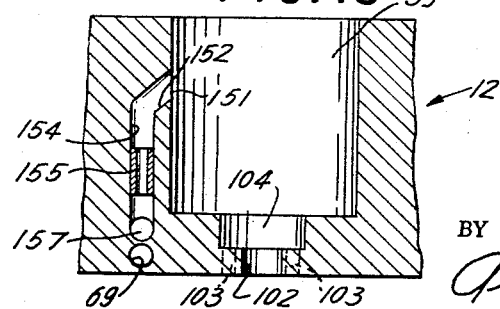
FIG. 18
INVENTOR.
ALLAN M. BICKFORD
BY
Albert M. Parker
ATTORNEY INVENTOR.
ALLAN M. BICKFORD
BY
Albert M. Parker
ATTORNEY

United States Patent Office 3,420,232
Patented Jan. 7, 1969

3,420,232
ANESTHETIC VAPORIZER
Allan M. Bickford, Huntington Station, N.Y., assignor to The Foregger Company, Inc., Roslyn Heights, N.Y., a corporation of New York
Filed July 20, 1965, Ser. No. 473,300
U.S. Cl. 128—188    10 Claims
Int. Cl. A61m 17/00

ABSTRACT OF THE DISCLOSURE

The anesthesia apparatus has a gas inlet and means to divide the gas to pass one stream through the anesthesia chamber to another and bypass another stream directly to the outlet. Valve means responsive to excessive gas pressure at the dividing position acts to increase the flow through the bypass in response to such pressure. A main control valve to control the one gas stream carrying entrained anesthetic material is operatively related to the shut-off valves to and from the anesthesia chamber to open those shut-off valves during part of its opening range and shut those valves on closing through that part of the range.

---

Anesthetic vaporizers of the type with which the present invention is concerned may employ, for example, an anesthetic such as fluothane, sometimes called "Halothane," which is administered to the patient in the form of a vapor mixed with a gas such as oxygen or air. The anesthetic is provided in liquid form in the bottom of a closed chamber, a portion of the carrier gas being circulated across the top of the liquid anesthetic and over wicking saturated with the anesthetic so as to vaporize it and to become mixed with it. The resulting mixture is then led through a control valve which meters it in the desired percentage to mix with the main gas stream, the final gas and vaporized anesthetic mixture being then discharged into the breathing circuit.

The concentration of vaporized anesthetic, that is, its percentage volume, that can be contained in a saturated mixture of carrier gas and vaporized anesthetic is dependent upon the vapor pressure of the liquid anesthetic. The vapor pressure of the liquid anesthetic varies with temperature. Accordingly, it is highly desirable to employ in the apparatus temperature responsive means for controlling the rate of flow of the vaporized anesthetic-gas mixture so that the percentage of anesthetic in the mixture, delivered to the patient shall remain substantially constant.

It is desirable to maintain the vaporizer unit connected at all times between the gas supply and the breathing circuit of the patient. With such system it is necessary to provide for the positive shutting off of the anesthetic circuit, while still permitting carrier gas to flow through the vaporizer. It is also necessary, in such system, to provide for an occasional flow of carrier gas at a high rate through the vaporizer without having the resistance of the vaporizer cause an excessive build up of pressure at the input line. Such latter condition might otherwise occur, for example, when the breathing circuit is being flushed with oxygen. The apparatus of the present invention provides all of the above features in novel manners, as will appear hereinafter.

It is accordingly among the objects of the invention to provide a novel improved anesthesia apparatus.

A further object of the invention lies in the provision of an improved anesthetic vaporizer which is particularly characterized by its ease of control and its maintenance of a substantially constant percentage of vaporized anesthetic which it delivers despite changes in temperature and in the rate of flow of the carrier gas-vaporized anesthetic mixture.

Yet another object of the invention lies in the provision, in an anesthetic vaporizer, of an improved, novel temperature compensating valve device.

Other objects of the invention reside in the provision, in an anesthetic vaporizer of the type described, of novel shut off valve means, of a novel control linkage connecting the adjustable control valve and the shut off valve so that both valves may be operated by a single means, and of a novel combined by-pass and pressure relief valve, such valve normally by-passing gas at a controlled rate and, upon the delivery of anesthetic gas at more than a predetermined maximum pressure, at a greater rate.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in side elevation of a first illustrative embodiment of anesthetic vaporizer made in accordance with the invention;

FIG. 3 is a view in plan of the vaporizer of FIGS. 1 and 2, the common operating knob for the adjustable gas control valve and the shut off valve being removed for clarity of illustration, the means interconnecting such valves being shown in the position which it occupies when both such valves are open;

FIG. 4 is a view similar to FIG. 3 but with the means connecting the flow control and the shut off valves being shown in the position which it occupies when such valves are closed;

FIG. 5 is a view in vertical cross section through the vertical axis of the first embodiment of the apparatus, the section being taken along the line 5—5 looking in the direction of the arrows in FIG. 3, certain of the parts being shown in elevation, the central valve, for controlling the rate of flow of the anesthetic-gas mixture, being shown in closed position;

FIG. 5A is a fragmentary view in horizontal section through an intermediate portion of the apparatus, the section being taken along the line 5A—5A of FIG. 5 looking in the direction of the arrows;

FIG. 10 is a view in vertical longitudinal section through the valve-containing body showing the half thereof which is opposite from that shown in FIG. 6, the section being taken along the line 10—10 in the direction of the arrows in FIG. 8;

FIG. 11 is a fragmentary view in vertical section through the left-hand end of the valve-containing body in FIG. 5, both such figures showing the shut-off valve in its open position;

FIG. 12 is a fragmentary view in horizontal section through the shut-off valve in its open position, the section being taken along the line 12—12 in the direction of the arrows in FIG. 11;

FIG. 13 is a view similar to FIG. 12 but with the movable valve element of the shut-off valve being turned to its closed position;

FIG. 14 is an enlarged view in vertical axial section through the combination by-pass and pressure relief valve of the apparatus, the section being taken similarly to that of FIG. 5 but with certain of the internal elements of the valve being shown in section;

FIG. 15 is an enlarged view in vertical axial section through the valve controlling the rate of flow of the anesthetic-gas mixture, certain of the elements being shown in elevation, the valve being shown opened somewhat from the closed position thereof shown in FIG. 5;

FIG. 16 is a fragmentary view in vertical transverse section through the valve-containing body of the apparatus, the section being taken along the line 16—16 of FIG. 6 looking in the direction of the arrows;

FIG. 17 is a schematic view in perspective of the first embodiment of the apparatus showing the paths of flow of the gas, the vaporized anesthetic, and the mixture of vaporized anesthetic and gas and also showing the valves for their control, the shut-off valve being shown in its open position;

FIG. 18 is a fragmentary view in vertical cross section taken along a plane radial of the gas control valve at the location of the gas discharge port thereof, the section being taken along the line 18—18 of FIG. 8 in the direction of the arrows;

Figure 19:
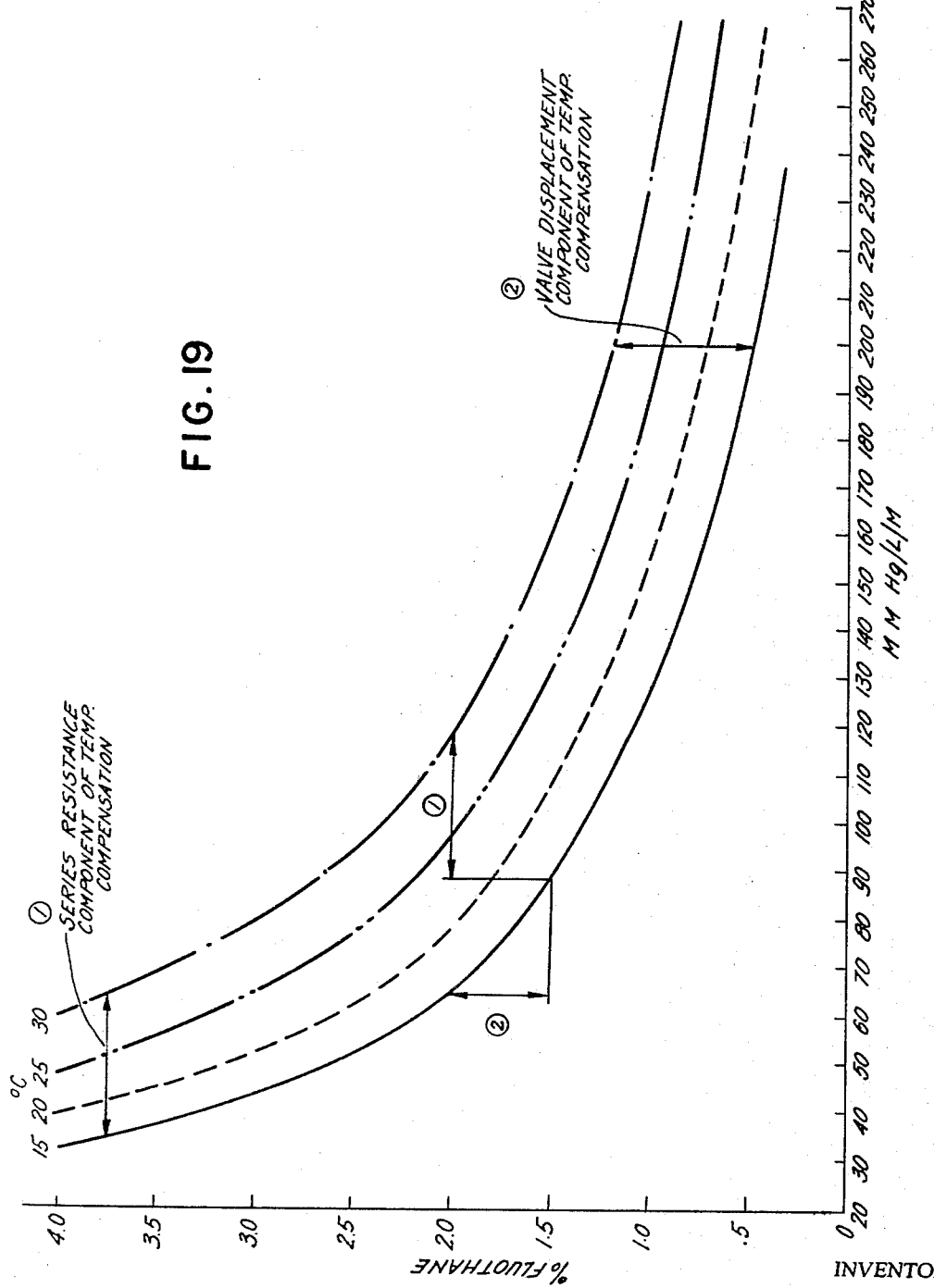
Figure 22:
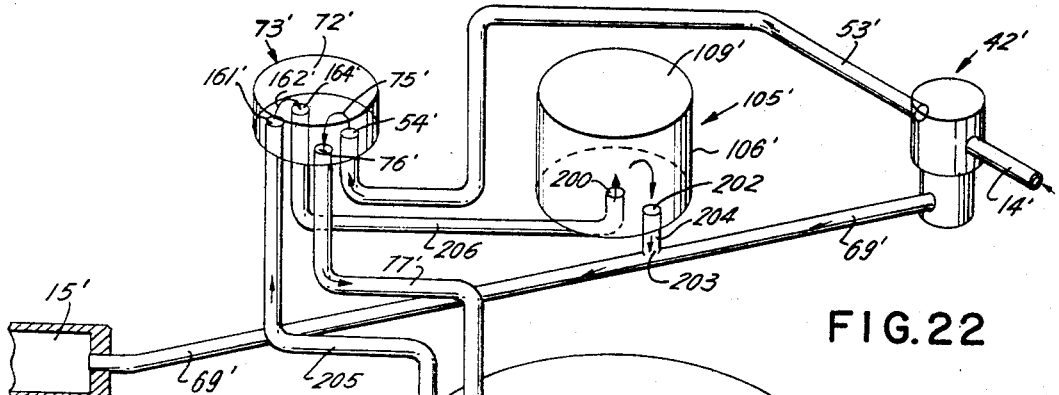
Figure 20:
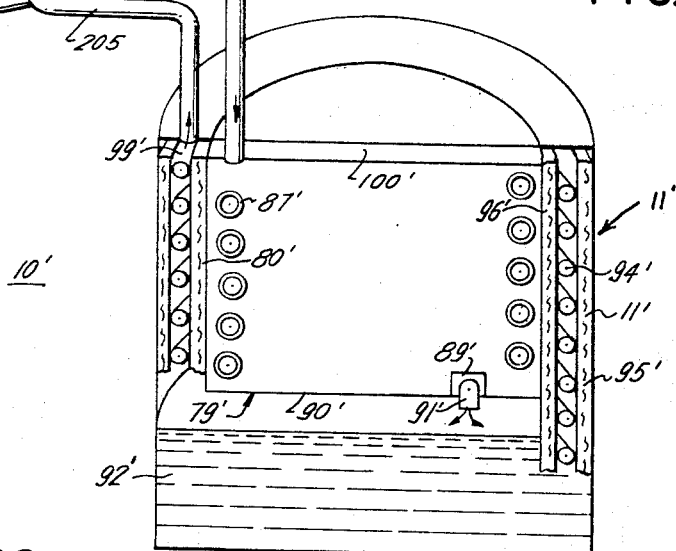
Figure 21:
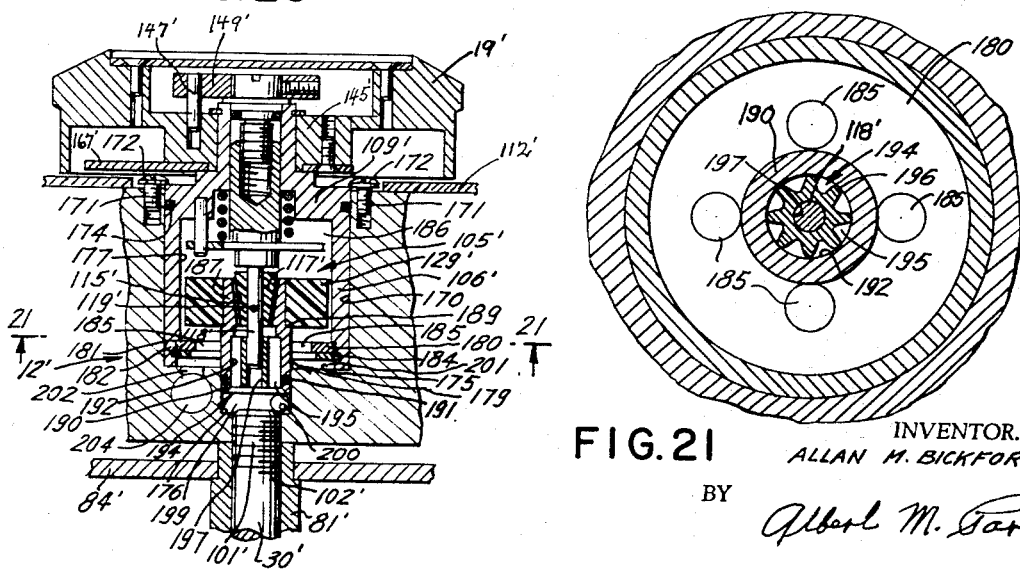

FIG. 19 is a graph showing the percentage by volume of a volatilized anesthetic, specifically fluothane, plotted along the vertical coordinate, against the resistance presented by the control valve to the flow of gas therethrough, designaed mm. Hg/L/M, along the horizontal coordinate, the graph showing curves corresponding to each of four representative temperatures encountered in an operating room;

FIG. 20 is a view in vertical axial section through the valve controlling the rate of flow of the anesthetic-gas mixture in a second, preferred embodiment of the anesthesia apparatus of the invention, certain of the elements being shown in elevation, the valve being opened somewhat;

FIG. 21 is an enlarged view in horizontal section through such valve of the second embodiment of the apparatus, the section being taken along the line 21—21 of FIG. 20 looking in the direction of the arrows; and FIG. 22 is a schematic view in perspective of the second embodiment of the apparatus showing the paths of flow of the gas, the vaporized anesthetic, and the mixture of vaporized anesthetic and gas and also showing the valves for their control, the shut-off valve being shown in its open position.

As will be apparent from the above, there are shown and described herein two embodiments of apparatus in accordance with the invention. The first embodiment of such apparatus is shown in FIGS. 1–18, inclusive. The second, presently preferred embodiment, is shown in FIGS. 20, 21, and 22.

The first embodiment of anesthetic vaporizer shown, which is generally designated by the reference character 10, has a main outer container 11 which in use is sealed except for the various valves and conduits contained in the body block or head 12 which is applied and sealed to the container shown. The head 12 is provided with a gas inlet nipple 14 which, in the embodiment shown, is of the internally tapered type, and with a nipple 15 of the externally tapered type through which the mixture of volatilized anesthetic and carrier gas is delivered. Device 10 is provided with a funnel 16, FIGS. 1 and 2, adjacent the base thereof through which liquid anesthetic is supplied to the space within the lower end of the container 11. The funnel is closed by a stopper 17. The rate of flow of the volatilized anesthetic-gas mixture is controlled by a valve generally designated 105, to be described, which may be adjusted by a rotatable knob 19 disposed at the top of the apparatus. The container 11 is provided with a sight glass 20, FIG. 1, through which the level of liquid anesthetic in the container may be observed, and with a drain valve having an operating knob 21 and a drain pipe 22 through which liquid anesthetic may be withdrawn from the apparatus when desired.

The apparatus 10 is provided with a base plate 24 having four projecting ears 26 to each of which a rubber covered foot 25 is attached. A centrally disposed upwardly directed thumb screw 27 secures the base plate 24 to a fitting 29 which is secured to the bottom of the container 11 by a central pilot portion 23 which projects through a central hole in the bottom of the container and is sealed thereto. Fitting 29 has an upstanding threaded stem 28 which is threadedly connected to and secures the lower end of a central standard 30 in the form of an upstanding rod which is disposed centrally within the container 11. The upper end of standard 30 is threaded at 101 (FIGS. 5 and 5A) and is screwed into the block 12 constituting the head of the apparatus to secure such block to the container 11. The lower end of the block or head 12 is telescoped within the upper end of container 11, the head having an annular outwardly projecting flange 31 which rests upon the upper edge of the sidewall 19 of the container 11. The head 12 is sealed to such sidewall of the container by an O-ring 32 which is disposed within an annular groove 34 adjacent the lower end of the head 12.

The gas inlet nipple 14 forms a part of an inlet fitting 35 which is secured to an end of the block 12, as shown. Within the fitting 35 and across the inner larger portion of the flared passage therethrough there is secured a filter 36. Gas entering the nipple 14 passes through the filter 36 and into an inlet port 41 on the end of the block 12 to which the fitting 35 is secured. Port 41 opens into a first cavity 37 in the head 12 in which there is disposed a by-pass valve 42, to be described. The head 12 contains two other cavities, a central cavity 39 containing a gas flow control valve 105, and a third cavity 40 containing an inlet and outlet shut-off valve 73. Such cavities and the valves contained therein are disposed in alignment, as shown in FIG. 5.

*General operation of the apparatus of FIGS. 1–18, inclusive*

Figure 1:
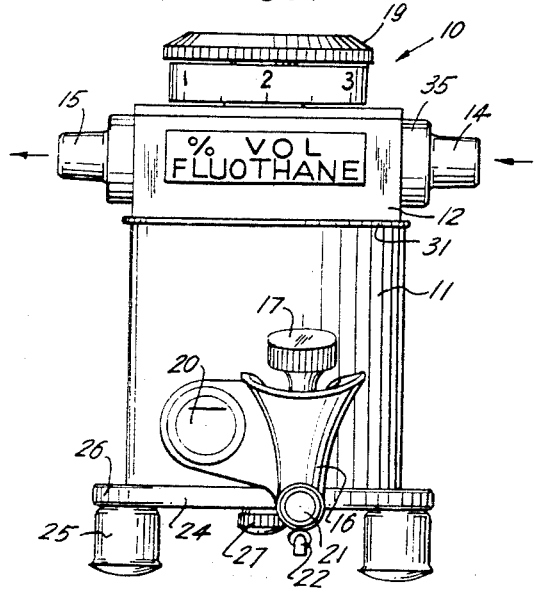
Figure 2:
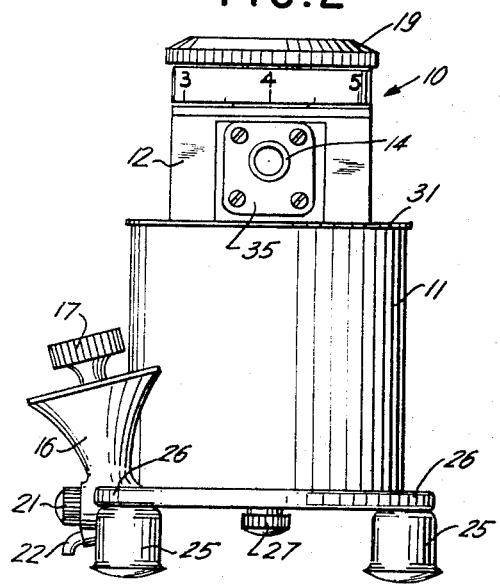
FIG. 2 is a view in end elevation of such vaporizer, the view being taken from a position at the right of FIG. 1 and looking to the left.
Figure 6:
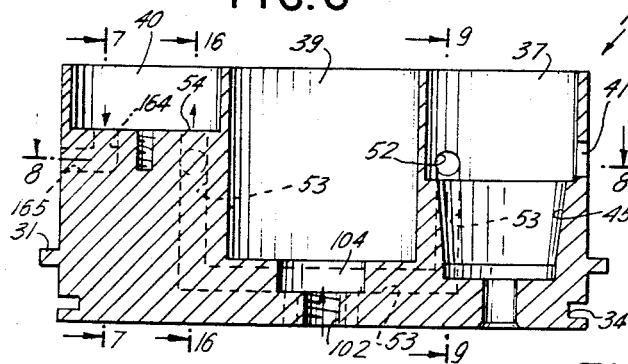
FIG. 6 is a view in vertical section through the block forming the valve-containing head of the apparatus, the section being taken similarly to that of FIG. 5 but with the movable valve elements being removed from the valve-containing cavities in the body.

Briefly, gas introduced into the apparatus through the inlet fitting 35 in its normal flow passes into the cavity 37, from there through the passage 53, FIG. 6, thence through the now open shut-off valve 73, and from there flows through a coil, 87, which provides a chamber of substantial volume and length therefor. From the coil the gas flows downwardly through the opening 91 across the top of the liquid anesthetic and upward in a spiral path defined between turns of a coiled wire 94, which is walled between outer and inner wicking members 95 and 96, respectively. The gas thus progressively becomes saturated with anesthetic vapor to form a mixture. Such mixture is then led upwardly into the central gas flow control valve 105, from which it flows to a second part of the shut-off valve 73 and thence to the outlet fitting 15. The by-pass valve 42, now to be described, normally provides a direct path between the inlet fitting 14 and the outlet fitting 15 at a controlled rate, and at a greater rate should the pressure of the gas exceed a predetermined desired maximum.

The by-pass valve

The combination by-pass and pressure relief valve 42 is shown more particularly in FIG. 14. Such valve has an outer body 44 which fits within the cavity 37, such cavity having an upper circular cylindrical portion and a lower portion having a downwardly converging frusto-conical peripheral surface disposed coaxially of the cylindrical upper portion of the cavity. As shown in FIG. 14, the frusto-conical lower surface of body 44 is spaced from surface 45 of cavity 37 to form a narrow annular gap 43. The outer body 44 of the valve 42 is retained in the cavity 37 as follows: Body 44 at its lower end is provided with a central depending hollow boss 83 which telescopes within a correspondingly shaped bore in body 12. Boss 83 is inwardly threaded and threadedly receives the upper stem portion 70 of a threaded stud which is permanently fixed to the body 12 at its enlarged lower end 71. Thus the valve 42 may be initially installed or removed when required by rotating the entire valve 42 within its cavity 37 as by engaging the shallow holes 4 in the upper end of the valve body 44 with a suitable spanner wrench.

The upper end of the body 44 of the valve is sealed to the circular cylindrical sidewall of the cavity 37 by an O-ring 47 disposed in an annular groove 46 near the upper end of body 44. Disposed below such sealing means 46, 47 and generally symmetrically with respect to the inlet port 41, the body 44 has a relatively deep and axially long annular groove 49 which forms a portion of the passage of normal flow of the gas from the inlet fitting 35 to the shut-off valve 73, as above described. The gas upon entering through port 41 flows peripherally around the groove 49. The upper portion of the body 44 radially inwardly of the groove 49 is provided with a central cavity into which gas flows from groove 49 through ports 50 and 51 in the upper portion of body 44.

Figure 8:
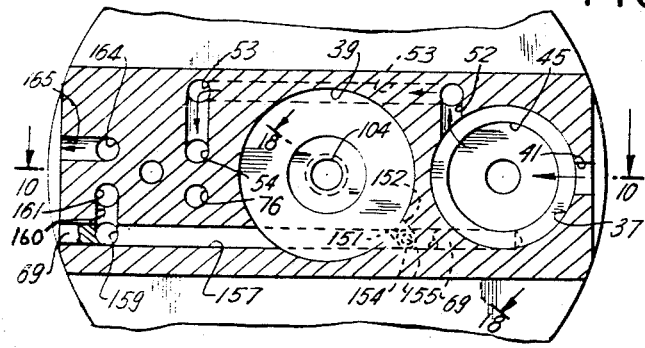
FIG. 8 is a view in horizontal section taken intermediate the height of the valve-containing body, the section being taken along the line 8—8 of FIG. 6 looking in the direction of the arrows.

As shown in FIGS. 6 and 8, the upper portion of the cavity 37 in the block 12 is provided with an outlet port 52 which communicates with the annular groove 49 in the outer valve body 44. Passage 52 is connected through a further composite drilled passage 53 in the body 12 to a first port 54 disposed in the bottom of the cavity 40 of the shut-off valve 73. The passage 53 is composed of a number of intersecting drilled passage portions, the portions of the passages which penetrate the surface of the block being appropriately plugged. For simplicity, the portions of the passages beyond their points of intersection and the plugs at the outer ends of such passage portions are omitted. This is also true with respect to various other passages in the block 12, presently to be described.

Telescoped within the lower end portion of the body 44 of the by-pass valve, and sealed thereto is a centrally disposed inner body 55. The body 55 projects upwardly through the central cavity in body 44 and is centrally located by having its upper end telescoped within a central recess in the lower portion of a plug member 56 which is telescoped into the central cavity of body 44. Plug member 56 is retained in the cavity by a spring ring 57 which fits within a groove in body 44 and overlies the plug member. The plug member 56 is sealed to the member 44 by an O-ring 58 which is disposed in an annular groove in the plug member. The inner body 55 is sealed to body 44 near the lower end of the former by an O-ring 59.

The inner body 55 of valve 42 carries a vertically reciprocable poppet valve 60 which selectively sealingly cooperates with an upwardly converging frusto-conical valve seat 61 disposed at the bottom end of the body 55. The poppet valve 60 has a lower enlarged head which has an annular groove carrying an O-ring 63 which sealingly cooperates with the valve seat 61.

The poppet 60 is resiliently urged toward its upper, sealing position by a coil compression spring 64 which acts between a spider 65, affixed to the upper end of an elongated central valve stem 62 affixed to the head of the poppet valve, the spider being slidable within the central bore of the body 55, and an annular valve seat 66 formed as the upper annular surface of an inwardly projecting flange on body 55. Generally vertically aligned with the passages 50 and 51 in body 44 there are passages 67 through the upper sidewall portion of the inner body 55 of valve 42.

It will thus be seen that with a spring 64 having predetermined desired compressive strength, the poppet 60 will remain closed until the upper surface of its enlarged head is subjected to gas pressure which is sufficiently high to overcome the spring and thus open the valve. The compressive strength of the spring 64 is such that in normal operation the poppet 60 is closed. Under such condition, the gas which enters the inlet fitting 35 passes from the annular grooves 49 downwardly through the annular gap 43 and thence downwardly to an annular space 78 which is formed between the lower end of the portion 45 of cavity 37 and the lower end of body 44.

Figure 7:
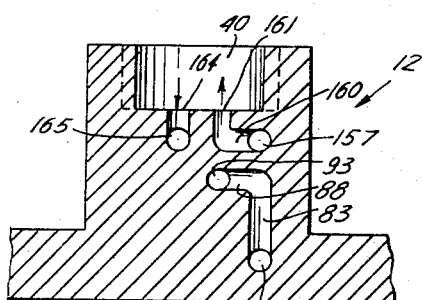
FIG. 7 is a view in vertical section through the valve-containing body adjacent the left-hand end thereof as it is shown in FIG. 6, the section being taken along the line 7—7 of FIG. 6 looking in the direction of the arrows.
Figure 9:
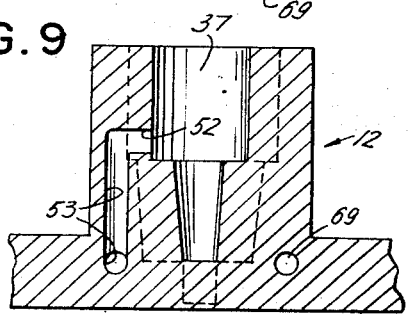
FIG. 9 is a view in vertical transverse section through the valve-containing body at a location adjacent the right-hand end thereof, the section being taken along the line 9—9 of FIG. 6 looking in the direction of the arrows.

As shown in FIG. 8, a horizontally disposed passage 69 in block 12 communicates with the space 78. Passage 69, which is fragmentarily shown in FIG. 8 for clarity of illustration, extends generally lengthwise of block 12, as indicated in FIGS. 7 and 9. At its left-hand end (FIG. 8) passages 69 connect with an annular space between the side wall of the container 11 and the block 12 which is sealed to and communicates directly with the outlet fitting 15 of the apparatus. Thus gas by-passed through the valve 42 travels through passage 69, finally to be discharged into the outlet fitting 15 of the apparatus. Such by-passed gas mixes with the gas-anesthetic vapor mixture, which has passed through the valve 105 in a manner to be described, the resulting final mixture being that which is delivered to the patient's breathing circuit.

When the pressure of the gas fed to the inlet connection 14 of the apparatus rises unduly, as when flushing the patient's breathing circuit with oxygen at a high flow rate, the normally closed poppet 60 of valve 42 opens. The opening of the poppet valve 60 relieves such pressure by additionally discharging the gas through the now open poppet valve, into the space therebelow, and through passages 68 into the space 78. From space 78 the thus discharged gas flows to the outlet fitting 15 of the apparatus along the path above described.

The passage through the valve 42 proper, taken with the attendant passages, is such that the length of such passage is much greater than its width, the ratio length/width being on the order of 100 or greater. As a result, the flow of gas through valve 42 and its attendant passages is laminar.

The shut-off valve

The shut-off valve 73 to which the gas flows, in the normal operation of the apparatus, through the above described port 52 and passage 53, has the cavity 40 thereof in the shape of a circular cylindrical disc having a flat circular bottom. The above described port 54 through which gas enters the valve from the passage 53 is disposed on one side of the central vertical axial plane through the apparatus, as shown in FIG. 8. The valve is provided with three other ports 76, 161, and 164, to be described, such ports being located on the respective corners of a rectangle, as shown. The valve 73 is provided with a rotatable valve element in the form of a disc which is accurately and sealingly received within the cavity 40. The valve element is mounted for rotation about a central vertical axle pin or screw 74 which extends through a central bore in the valve element 72 and is screwed into the block 12, such pin retaining the lower face of the valve element in face-to-face engagement with the lower wall of the cavity 40 by means of a spring washer disposed beneath the head of the screw 74, as shown.

Valve element 72 has a first passage 75 therein in the form of an arcuate slot of such radius and peripheral length that in the open position of the valve, shown in FIG. 12, the ports 54 and 76 are in alignment with the ends of the passage 75. The port 76 is connected to a vertically extending passage 77 which conducts the gas to the above-described helical tube. Such helical tube, which is generally designated 87, is disposed with its axis vertical and within an inner container or can 79 fairly close to the sidewall 80 of the can.

The container or can 79 is provided with an axially extending sleeve 81 which is joined and sealed as by soldering at its lower end to the bottom 90 of the can and is similarly joined and sealed to the top 84 of the can. The top 84 is joined and sealed to the upper edge of the body of the can, as by being soldered to it. The upper end of the standard 30, as we have seen, is threaded at 101. Such threaded upper end is threadedly received with a central threaded passage 102 in the bottom of block 12. The standard 30 has an annular shoulder 82 intermediate its length, the can 79 being supported on such shoulder, as shown. When the head or block 12 is screwed onto the upper end of standard 30 (FIG. 5), the sleeve member 81 is clamped between the shoulder 82, acting through the central portion of bottom 90 of can 79, and the central portion of the lower surface of block 12.

The above-described passage 77 from port 76 of valve 73 is connected at its lower end to an inlet fitting 85 which is sealed to a disc-like member 84 which closes the top of the can 79. The upper end of coil 87 is connected to fitting 85 at 86, as shown in FIG. 5. The lower end of coil 87 is connected to an outlet fitting 89, which is sealed to the bottom 90 of the can 79, such outlet fitting having a discharge opening 91 through which gas issues from the coil to flow into the space above the body of liquid anesthetic 92 in the bottom of the container 11.

Disposed along the sidewall 19 of container 11 is an external layer of wicking 95. A coil of wire 94 with widely spaced turns is disposed within wicking 95; a further inner layer of wicking 96 is located between the wall 80 of can 79 and the helical wire 94. The bottom ends of wicking layers 95 and 96 extend downwardly adjacent the bottom of the can and are thus immersed in the liquid anesthetic 92. The gas emerging from discharge port 91, in flowing across the liquid anesthetic 92, picks up volatilized liquid anesthetic to form an anesthetic-gas mixture. The only path of escape of such mixture from the container 11 is through the wicking layers 95, 96 and the spaces presented between successive turns of the helical wire 94. The carrier gas in travelling upwardly through such helical path between the layers of wicking soaked with liquid anesthetic becomes saturated with anesthetic vapor.

The apparatus presents an annular space between the upper surface of cover 84 of can 79 and the bottom surface of the valve-containing block 12, such space being generally designated 100. The anesthetic-gas mixture rises from the described vertical passage between the walls 19 and 80 of containers 11 and 79, respectively, and turns at the locations 99 to flow generally radially into the space 100 from which it is discharged into a central passage 104 leading to the valve 105. Communication between the space 100 and the central passage 104 is afforded by a plurality of vertical holes 103 (four shown) which are drilled tangent to the side wall of passage 104, the lower ends of holes 103 lying outside the area of contact between the upper end surface of sleeve member 81 and the lower surface of block 12.

*The gas control valve*

The structure of the gas control valve 105 is shown in FIGS. 5 and 15. As shown particularly in FIG. 15, the valve 105 has an outer generally circular cylindrical housing having a lower end portion and an upper end portion 109. Housing 106, 109 is accurately received within the cavity 39 in the valve-containing block 12. Such cavity 39 has a bottom wall 107 which is centrally apertured to provide the above-described chamber 104. The upper end portion 109 of the housing of the valve 105 is sealed to the sidewall of the cavity 39 at the upper end thereof by an O-ring 110 received within a groove in such upper portion 109 of the housing. The housing of the valve includes a bottom member 108 of stepped configuration; the upper smaller diametered portion of member 108 is telescoped into the lower end of the housing portion 106. The lower end of housing portion 106 and the radially outward lower end portion of member 108 are sealed to the sidewall of the cavity 39 adjacent the lower end thereof by an O-ring 111, as shown. The larger diametered lower portion of the top member 109 of the housing of valve 105 is disposed beneath a sheet metal cover member 112 which is retained upon the top of block 12 and which also covers the pressure relief valve 42 and the shut off valve 73, as shown in FIG. 5.

The gas control valve 105 has a first fixed valve seat 115 which is formed in a central insert member 114 of stepped configuration, the member 114 being received within a bore and counterbore in member 108, as shown, and overlying the bottom wall 107 of the cavity 39 in its central portion so that member 114 is fixed and sealed to member 108. Member 114, in the illustrative embodiment, as well as housing 106, 109 and member 108, are formed of stainless steel, which has a coefficient of linear expansion on the order of $9.6 \times 10^{-6}$ per degree C. The valve seat 115 has a relatively small conical angle on the order, for example, of 15°. Telescoped within the fixed valve seat 115 is a member 117 which has a frusto-conical outer surface 120 which is complementary to the valve seat 115 and thus forms the second seat of the valve. In the illustrative embodiment the member 117 is formed as a sleeve of plastic material having a relatively large positive linear coefficient of thermal expansion, that is, the material expands upon an increase in temperature. Preferably, member 117 is made of a fluorocarbon plastic material of which polytetrafluoroethylene is one preferred example. Such material, which is also known as PTFE or TFE, has a linear coefficient of thermal expansion on the order of $10 \times 10^{-6}$ per degree C. Such material is highly resistant to attack by the anesthetics encountered in the use of the apparatus, including fluothane. Member 117 may also be made of other materials having generally similar properties, with suitable changes in the diameters of member 117 and of seat 115 to accommodate for the different coefficients of thermal expansion of the different materials used. The surface of the valve seat 120 on member 117 coacts with the valve seat 115, and the member 129, to be described, coacts with the inner sidewall of the housing 106, 109, so as to provide the valve 105 with temperature compensating characteristics whereby to maintain the percentage of volatile anesthetic in the anesthetic-gas mixture substantially within the relationships illustrated in the graph of FIG. 19.

The passage through valve 105 proper, taken with its attendant passages, is such that its length is much greater than its width, the ratio length/width being on the order of 100 or more. Consequently, the flow of the gas-anesthetic vapor mixture therethrough is laminar.

The member 117 is connected to form a part of a vertically reciprocable adjustable valve stem whereby the effective cross section of the passage between the valve seats 115 and 120 may be adjusted manually. Thus the valve has a central stem member 116 having a lower central pin portion 118 of reduced diameter over which the member 117 is telescoped. Member 117 is retained upon such lower pin portion 118 by a cross pin 119 which penetrates both members.

The above-described lower member 108 of the valve housing has a central sleeve portion 122 rising thereabove, the upper end of portion 122 being formed as an inwardly projecting flange which guidingly receives the valve stem 116 somewhat above the portion 118 thereof. The main portion of the sidewall of member 122 is spaced somewhat radially from the valve stem 116. Such sidewall is provided with a plurality (two shown) of radially directed passages 124 which permit gas entering the valve from chamber 104 and passing between the valve seats 115 and 120 to flow radially outwardly into the cavity within the side housing member 106. The upper end of the valve stem 116 is of circular cylindrical shape and is accurately guidingly received within the vertical central bore 126 of an upstanding central sleeve portion 127 of the above-described upper housing member 109 for the valve. The valve stem 116 is thus accurately guided for vertical adjustment along the common axis of the two valve seats 115 and 120.

The valve 105 is provided with the further temperature compensating means 129, 106 briefly referred to above. Mounted upon the valve stem 116 so as to lie coaxial thereof is a generally disc shaped member 129 which is telescoped over the valve stem and is secured thereto by a transverse pin 130 projecting through the member 129 and the valve stem. To shorten the valve 105 vertically, in the embodiment shown, the central portion of member 129 is provided with an upwardly converging frustoconical recess into which the similarly shaped upper end of part 122 projects. Members 129 and 122 do not contact each other at any time. Member 129 is, like member 117, formed of plastic material having a relatively large thermal coefficient of expansion. Member 129 may be formed of the same materials as member 117.

The member 129, which is of circular cylindrical external configuration, has an outer diameter which is somewhat less than that of the bore 131 of the sidewall casing member 106 of the valve. The annular space thus provided between the periphery of the member 129 and the bore 131 of the valve casing is disposed in series with the lower part of the valve cavity and the outlet port 151 which is disposed at the upper end of the housing 106, 109. Such annular passage decreases upon an increase in temperature by reason of the much greater coefficient of expansion of member 129 as compared to member 106, 109.

The valve stem 116 is constantly urged in a downward, valve-closing direction, by a coil compression spring 134 which is disposed between an upper annular spring seat 135 on member 109 and a disc-shaped plate member 132 which overlies member 129, and to which the valve stem 116 is affixed by being telescoped through the number 132. As shown, the plate 132 is disposed in engagement with an annular shoulder between the upper largest diametered portion 125 of valve stem 116 and a lower slightly smaller diametered portion 121 thereof. The valve stem 116 is adjusted vertically by an adjusting screw 137 which is threadedly received within a central bore 136 in the upper end of portion 125 of the valve stem. The screw 137 has an enlarged head portion 138 which has an annular groove therein receiving an O-ring 139 which seals the head of the screw to the wall of the bore 136 in member 127. Above such head 138 the screw 137 is provided with a flange 140 which rests upon the upper edge of the sleeve 127 and prevents downward travel of the screw. Thus turning of the screw 137 in one direction permits the spring 134 to advance the valve stem 116 toward its lower, closed position, and the turning of the screw in the opposite direction raises the valve stem against the opposition of spring 134.

The valve stem 116 and the member 129 attached thereto are prevented from rotation by means of a pin 142; the upper end of such pin has a press fit with a downwardly open passage in the lower end of housing portion 109. The lower end 144 of pin 142 is slidably received through a hole in plate member 132 and within a bore in member 129. Thus portion 144 of pin 142 may slide freely with respect to members 129 and 132 as the valve stem 116 is raised and lowered. The pin 142, however, prevents the valve stem 116 from rotating when the valve adjusting screw 137 is turned.

The apparatus shown incorporates means whereby the valve 105 may be adjusted without subjecting the valve stem 116 to sidewise forces which might alter the effective area of passage between the valve seats 115 and 120 without the turning of the valve stem. Thus the adjusting knob 19 of valve 105 is provided with a hub 145 which is journalled upon the outer surface of the upwardly projecting sleeve-like upper end portion of member 109. Such hub 145 rests upon a shoulder 148 at the base of such sleeve-like member and is retained upon the member by a spring ring 146 which is snapped into a groove at the upper end of the sleeve-like member and overlies the central portion of the hub. Mounted upon the crank member 149 as by being press fitted thereinto is a downwardly projecting pin 147, the lower end of which extends into a hole somewhat larger than the pin located in the hub 145. The crank member 149 is retained upon the head 141 of the adjusting screw 137 by a set screw 150. It will thus be seen that sidewise forces exerted upon the knob 19, as by the resting of the operator's hand thereon, are isolated from the adjusting screw 137, the screw being subjected only to turning movement caused by the intersection of the pin 147 and the crank member 149.

*The shut-off valve, continued*

The shut-off valve 73 has been partially described above. The ports 54 and 76 of such valve taken with the arcuate passage 75 in the movable valve element 72 thereof permit the gas entering the chamber of the apparatus containing liquid anesthetic through the nipple 14 to be shut off when the movable valve element is turned into the position of FIG. 13. The lower surface of the cavity 40 also has two additional ports 161 and 164 which are disposed in the lower surface of the cavity 40 symmetrically with respect to the ports 76 and 54. Such latter ports 161 and 164, together with a second arcuate passage 162 in the movable valve element 72, permit the anestheticgas mixture to be shut off from the gas control valve 105 of the apparatus when the movable valve element 72 is turned from the open position of FIG. 12 to the closed position of FIG. 13. In such latter position the arcuate passages 75 and 162 lie midway between the ports 76 and 161 on the one hand and ports 54 and 164 on the other, all of such ports then being closed by imperforate portions of the movable valve element 72 which confront and sealingly contact the ports.

The saturated anesthetic-gas mixture which flows through the valve 105 is exhausted therefrom through passages 151 in the upper portion of the housing 106, 109, the gas then flowing into an annular channel 153 which is disposed between the thinner central portion of the housing 106, 109 and the sidewall of the cavity 39 in the block 12. The annular channel 153 is connected by a short radially and downwardly inclined passage 152 (FIGS. 10 and 18) to a vertically extending passage 154. Passage 154, which may be formed by drilling block 12, may have a flow-constricting insert 155 pressed thereinto, as shown in FIG. 18. It will be understood that if the passage 154 itself has the proper diameter for the desired gas flow, the bushing 155 is not employed. It will be understood that passage 154, after having been drilled into the block 12, is closed at its outer end as by a solder plug (not shown). The lower end of the passage 154, below the insert 155, is connected to a horizontally extending passage 157 in block 12, passage 157 extending to a location below and to the laterally outer side of the port 161. As shown in FIG. 18, the passage 157 lies parallel to and directly above passage 69.

A vertically extending passage 159 connects passage 157 to a further short transverse passage 160 which in turn extends to the port 161 of valve 73. The port 164 is connected by a short passage 165 which extends to the same sealed space between block 12 and the outlet fitting of which nipple 15 is a part, as does the pressure relief outlet 93, above described. It will thus be evident that when the movable valve element 72 of valve 73 is turned into the open position of FIG. 12 the anesthetic-gas mixture delivered from valve 105 through port 151 travels through passage portions 152, 154, the flow restricting insert 155, and passage portions 157, 159, and 160 to port 161, whence it is delivered to the outlet nipple 15 through the arcuate channel 162, the port 164, and the passage 165. When element 72 of valve 73 is turned into its "off" position, the output of anesthetic vapor laden gas from the chamber containing the liquid anesthetic 92 is shut off, as well as the supply of carrier gas to such chamber through the passage 77.

The operating means for valves 105 and 73

In the embodiment of the apparatus shown, the valve 105 is opened upon the turning of the valve adjusting knob 19 clockwise, and is closed upon the turning of the knob 19 counterclockwise (FIGS. 3 and 4). The apparatus incorporates means whereby the turning of the knob 19 both adjusts the valve 105 and operates the shut off valve 73.

The valve operating means is such that upon the turning of the knob 19 clockwise toward its open position from the closed position (FIG. 4), the shut off valve 73 is opened during the first fraction of a turn of the knob 19, as shown in FIG. 3, and upon turning of the knob 19 counterclockwise to close the valve 105, the shut off valve 73 is closed as the knob 19 reaches its closed position. Such means linking the valves 105 and 73 is shown more particularly in FIGS. 3, 4, and 5. As there shown, the rotatable valve element 72 of valve 73 is provided with an upstanding pin 166. Pin 166, when the shut off valve 73 is open, lies in the position shown in FIGS. 3 and 12, and when the shut off valve is closed lies in the position shown in FIGS. 4 and 13. Attached to the hub 145 of the knob 19 at its lower end is a part-circular plate 167 having a generally radially projecting arm with a radius which somewhat exceeds the distance which the pin 166 lies from the axis of the hub 145 in either the open or closed positions of the shut off valve. As shown, plate 167 is attached to the hub 145 by a plurality of machine screws, of which one is designated 169.

The plate 167 has on one edge of its arm adjacent its radially outer end a pocket 171 which, in the closed positions of both valves 105 and 73 shown in FIG. 4 receives pin 166 therewithin. The pocket 171 is in the form of more than half of a circle. The radially outer side of the entrance passage to such pocket 171 is in the form of a straight surface 172; the radially inner side of such entrance passage is smoothly convexly rounded, as shown at 173. The other edge of plate 167 has a shallow arcuate pocket 170 therein located to receive the pin 166 when both valves 105 and 73 are turned to their fully open positions, shown in FIG. 3.

To open valves 105 and 73, the knob 19 is turned clockwise from its closed position of FIG. 4. In the first part of such clockwise turning of knob 19, the pin 166 is contacted by the convex surface 173 on plate 167, and thus the pin and the valve element 72 of valve 73 are turned counterclockwise sufficiently to open valve 73. Thereafter the knob 19 may be turned further in a clockwise direction to adjust the valve 105 to the desired rate of flow of the anesthetic-gas mixture therethrough. Such adjusted position of the knob 19 will ordinarily lie somewhat short of the fully open position of valve 105 shown in FIG. 3. At such fully open position, the pin 166 is received within the pocket 170, which with pin 166 serves as a mechanical stop for the valve 105 in its fully open position.

When it is desired to shut off the apparatus 10, the knob 19 is then turned counterclockwise, whereupon the valve 105 is not only closed but the pin 166 is then contacted by the outer end of the cam-like surface 172, so that the pin enters the pocket 171. The pin 166 with the movable valve element 72 of the shutoff valve 73 on which it is mounted are thus turned clockwise into the position shown in FIG. 4, wherein the movable valve element 72 occupies the closed position shown in FIG. 13, upon such encounter between pocket 171 of member 167 and the pin 166. Further turning of the knob 19 in a counterclockwise direction is prevented by engagement between the bottom of pocket 171 and the pin 166, as shown in FIG. 4. The bottom of such pocket and the pin thus function as a mechanical stop for valve 105 in its closed position.

The operation of the temperature compensating valve

The manner of operation of the valve 105 in maintaining the set percentage of fluothane constant despite changes in ambient temperature will be clear upon consideration of FIG. 19 and the following discussion. FIG. 19 is a graph showing the percentage by volume of a volatilized anesthetic, specifically fluothane, plotted along the vertical coordinate against the resistance presented by the control valve 105 to the flow of gas therethrough, such resistance being designated mm. Hg/L/M along the horizontal coordinate, the graph showing four curves, each corresponding to a respective representative temperature which might be encountered in an operating room. In the above expression for resistance gas flow, mm. Hg means pressure in millimeters of mercury, L means liters, and M means minutes.

If a plot is made of valve position against the resistance to fluid flow therethrough of any valve, it will make a curve generally similar to the graph of FIG. 19 in which the ordinate represents the degree of valve opening, and the resistance to fluid (gas) flow is represented by the abscissa. With the valve open, the resistance to flow will be at its minimum, having a value somewhat in excess of zero. As the valve approaches its closed position, the resistance to fluid flow through the valve approaches infinity.

In order to maintain a given percentage of anesthetic (fluothane) in the gas-vapor mixture administered to the patient, the resistance to flow of the mixture through the valve must be changed with temperature to compensate for the ability of the gas to absorb more fluothane as the temperature increases. The four curves shown in FIG. 19 indicate the resistance to gas flow which is required of the valve 105 for each of the temperatures indicated in order that the valve will deliver a mixture having fluothane present in the desired percentage by volume. It will be seen that a temperature responsive resistance to gas flow in series with a valve would adequately compensate the high percentage ends of the curves with a required spread of approximately 30 resistance units (mm. Hg/L/M) over the temperature range of 15–30° C. This is shown by the horizontal double arrow 1 at the upper left hand ends of the curves.

However, a 30 resistance unit change near the lower volume percentage settings of the valve would be far short of the required change in resistance to gas flow. At the low percentage end a vertical displacement of the movable valve element 117 of the valve 105 over a range of approximately .75% by volume of fluothane (the double arrow labelled 2 at the lower right hand end of the curves) would be an ideal approximation for correction over the temperature range 15–30° C. But this alone would be inadequate as a corrective measure at the high percentage end of the curves, as can be seen by reference to the intermediate double arrow 2.

In accordance with the invention, the required temperature compensation is secured by employing two elements affecting the rate of flow of gas through the valve as a function of temperature: (1) a series element composed of parts 129, 131 (106, 109), and (2) a "displacement" element 117. The expansion and contraction of the element 117 is equivalent to an axial displacement, that is, movement up and down, respectively, relative to valve seat 115, or rotation of knob 19 to produce axial movement of the valve element 117. The diameters and lengths of the elements 117 and 129 are selected to provide the desired degree of change with temperature of the resistance to flow of the gas through the valve 105. The two resistance components 1 and 2 combine over the desired ranges of temperature and percentage by volume of fluothane to provide for the desired temperature compensation.

The manner in which the apparatus functions to produce the results shown in the curves of FIG. 19 will perhaps be better understood by reference to an analogous electrical circuit wherein there is a network composed of a resistance $R_1$ (corresponding to the by-pass valve 42) and a variable resistance $R_2$ (corresponding to the valve 105) connected in parallel with resistance $R_1$, a current $L_T$ (corresponding to the rate of total gas flow) flowing to, through, and away from the network, and a voltage (corresponding to the drop in gas pressure through the apparatus) applied across the network. The current flowing through the resistance $R_1$ (corresponding to the rate of flow of gas through the by-pass valve 42) is designated $I_1$, and that flowing through the resistance $R_2$ (corresponding to the rate of flow of gas through the valve 105) is designated $I_2$. (It will be seen that $R_1$ is substantially constant, as is the resistance to gas flow through the normally partially open valve 42 and its attendant passages.)

By analogy, what is desired is to set and maintain substantially constant the current (gas flow) ratio $I_2/I_1$ over a wide range of variation of the total current $I_T$ (total gas flow). In the electrical circuit it can be seen, by applying Ohm's law, that the ratio of the two currents $I_2/I_1$ is proportional to the ratio of the resistances $R_1/R_2$. The above described valve 105 with its two associated temperature compensating elements function in accordance with Ohm's law, and thus maintain a constant ratio $$\frac{\text{rate of gas flow through valve 105}}{\text{rate of gas flow through valve 42}}$$

over a wide range of the total rate of flow of the gas.

It is known from the physics of fluid flow that if laminar flow is maintained in a fluid conducting passage (at subsonic velocities) the resistance to the flow of fluid offered by the passage will be in accordance with the pressure/flow rate. As we have seen above, the passages through each of valves 42 and 105, where resistance is desired, are constructed so that the length is much greater than the width, the ratio length/width being on the order of 100 or greater. As a result of the described construction of the vaporizer, a typical vaporizer made in accordance with the invention maintains the desired percentage by volume of anesthetic, determined by the setting of knob 19, over a range of gas flow at the input connection 14 of from .5 to 10 liters per minute.

*The embodiment of FIGS. 20, 21, and 22*

In FIGS. 20, 21, and 22 there is shown a second embodiment of anesthesia apparatus in accordance with the present invention. Such apparatus, in general, differs from that of the above first-described embodiment of the apparatus in that the passages in the head of the apparatus, here designated 12', are somewhat simplified, that the second portion of the composite shut-off valve 73' is disposed in advance of the gas-controlling valve 105' rather than following it, and that the gas-volatilized anesthetic mixture travels first upwardly and then downwardly within the valve 105'. The embodiment of FIGS. 20, 21, and 22 is presently preferred over the first described embodiment and apparatus, since it avoids interference with the flow of the gas-anesthetic mixture which may sometimes occur within valve 105 by reason of condensation of the anesthetic caused by the pressure drop in the path between the valve seats 117 and 120 and the pressure drop in the path between the outer surface of the body 129 and the inner surface of the bore 131 of valve 105. Although the apparatus of the first described embodiment operates satisfactorily, it has been found that condensed anesthetic therewithin at times may tend to be drawn down past the member 129, thus partially obstructing such second path. The apparatus of the second embodiment overcomes such difficulty.

Further, in the first described embodiment the interior of valve 105 remains connected to a substantial gas mixture carrying part of the system through ports 151 and passages 154, 157 even though the valve 105 is closed. Thus condensate from the anesthetic may tend to collect in the valve. In the system of FIGS. 20, 21, and 22, however, upon the closing of the gas-controlling valve 105' the interior of the valve above the engaging valve seats thereof is isolated from the parts of the system which carry the gas-anesthetic mixture. The upper and laterally outer portions of the cavity within valve 105' remain open to the carrier gas by-passed by valve 42', however, so that the interior of the valve 105' is then swept clear of any anesthetic condensate which may have formed therein.

In FIGS. 20, 21, and 22 parts which are the same as or generally the same as those of the first described embodiment are designated by the same reference characters but with added primes. Parts which differ substantially from those of the first described embodiment are designated by different reference characters. The head or block 12' of the apparatus is provided with a bore 170 which is open to the top of the block. Within such bore there is disposed an outer valve body 109', which may be made of stainless steel of the same type as body 109 of the valve 105, such body 109' having a lower circular cylindrical sleeve portion 106' snugly fitting within the bore 170. The inner surface 177 of sleeve 106' is in the form of a circular cylinder coaxial with bore 170. The valve body 109' is retained in the valve block 12' by machine screws 171 having heads 172 the outer portions of which overlie the upper edge of the valve body 109'. Body 109' is sealed to the bore 170 adjacent its upper end by an O-ring 174 which is received within an annular groove in body 109'. The bore 170 terminates at the bottom in a transverse annular surface 175, block 12' being further provided with a small central bore 176 which extends downwardly from surface 175 coaxial with bore 170. The lower end of bore 176 is employed as a part of the passage means for introducing the gas-anesthetic mixture into the valve 105' in a manner to be described.

The lower, gas-anesthetic receiving end portion of the valve 105' includes a generally circular cylindrical member 179, the lower end of which is snugly received within the bore 176 and is sealed thereto by an O-ring 191. Intermediate the length of the member 179 and positioned somewhat above the lower end surface 175 of bore 170, there is a radially outwardly extending transverse flange 180, the outer end of which fits within a seat 181 provided in the lower end of the sleeve 106'. The flange 180 and thus the member 179 are retained in the position shown in FIG. 20 by a spring ring 182 which is snapped into an annular groove 184 in the inner surface of the sleeve 106' beneath the flange 180. The flange 180 is provided with a plurality (four shown) of holes 185 therethrough to furnish communication between the upper part 186 of the cavity within the body 109' with the space 201 below the flange 180.

The upper portion of the body 179 is in the form of an upstanding sleeve 187 having an upwardly diverging frusto-conical valve seat 115' coaxial with the member 179. Valve seat 115' cooperates with the outer surface of a downwardly converging frusto-conical valve sleeve 117', the outer surface of which is complementary to the valve seat 115'. Member 117' is formed of the same material and functions similarly to the sleeve member 117 of the first-described embodiment. The outer surface of the upper portion of body 179 is provided with a portion of smaller diameter terminating in an annular shoulder. The temperature responsive body 129', which is in the form of a thick centrally perforated disc, is snugly and accurately received over the upper end of body 179 and is supported upon the said annular shoulder.

Centrally within the bore 192 within the lower portion 190 of member 179 there is disposed a guide insert 194, the structure of which is more particularly shown in FIG. 21. Member 194 has a generally sine-shaped peripheral surface, the peaks 196 of which snugly engage the surface of bore 192 in portion 190 of member 179. The spaces 195 between successive peaks 196 of the guide member 194 provide passages for conducting the gas-anesthetic mixture upwardly to the cooperating valve seats of the valve 105'. Member 194 is provided with a central bore 197 which receives and guides the depending free end of the pin 118' upon which the valve member 117' is mounted.

In the construction of FIGS. 20, 21, and 22, the central stem member 30' which rises within the container 11' is secured and sealed to the lower end of the valve block 12' by being screwed thereto through the medium of interfitting threads 101' on member 30' and threads 102' in a bore at the lower end of block 12' coaxial with bores 170 and 176. As before, the central stem member 30' is provided with a sleeve 81', the upper end of the sleeve abutting the lower end of block 12'. The cover plate 84' is supported upon a shoulder adjacent the upper end of the sleeve 81'. It will thus be seen that the space 201 of valve 105' is closed except for the passage 200 leading thereinto.

The gas-anesthetic mixture in this embodiment is introduced into the valve 105' through a passage 200 in block 12', the inner end of passage 200 terminating at a chamber 199 which lies within the block above the upper end of the stem member 30'. Such mixture then rises through the passages 195 presented between the guide member 194 and the bore 192 and then passes between the spaced frusto-conical valve seats of the valve 105'. The upper end of the upper space 186 within the valve body 109' is closed in this embodiment. The mixture therefore after passing between the valve seats then flows downwardly through the path presented between the outer peripheral surface of the body 129' and the bore 177, through the holes 185 and into a discharge passage 202 through the surface 175 and thence into a further passage 204. Thus as above explained the path of the gas-anesthetic mixture through valve 105' is first upwardly through the first manually adjustable valve and thence downwardly between the temperature responsive member 129' and bore 177 from which the periphery of member 129' is spaced a small distance which varies with temperature.

The differences in the paths of flow of the gas-anesthetic mixture between the first and second embodiments will be readily seen by comparing FIG. 22 with FIG. 17. Thus in FIG. 22 the gas-anesthetic mixture is shown rising to the shut-off valve 73' through a pipe 205, the mixture being lead from valve 73' to the gas-controlling valve 105' through a pipe 206 which communicates with the above-described passage 200. The mixture is then shown passing upwardly within the body 109' of the valve 105' and thence downwardly into the passages 202, 204. Finally, such mixture is lead directly to the passage 69' which leads to the fitting 15' connected to the patient's breathing circuit.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:
1. Anesthesia apparatus having a casing forming an enclosed chamber adapted to contain a quantity of liquid volatilizable anesthetic gas, inlet means on the apparatus for receiving a carrier gas under pressure, gas outlet means on the apparatus for discharging a mixture of the carrier gas and volatilized anesthetic under pressure to a patient's breathing circuit, including means for dividing the carrier gas received at the gas inlet means proportionally into two streams, means for conducting a first one of said streams of gas into the chamber so as to entrain vaporized anesthetic therein to form a gaseous mixture, means to discharge said mixture to the gas outlet means, and means for conducting the second of said streams in by-passed relationship with respect to said chamber from said dividing means to said gas outlet means of the apparatus, wherein the means for dividing the carrier gas received at the gas inlet into two streams includes a normally closed valve responsive to the pressure of the received gas which opens to by-pass a larger proportion of the gas into the second stream when the pressure of the received gas exceeds a predetermined value.

2. Anesthesia apparatus as claimed in claim 1, comprising an adjustable valve interposed in the means discharging the gaseous mixture for controlling the flow of the gaseous mixture.

3. Anesthesia apparatus as claimed in claim 1, comprising a shut-off valve interposed in the means discharging the gaseous mixture for shutting off the flow of the gaseous mixture.

4. Anesthesia apparatus as claimed in claim 1, comprising, a control valve for controlling the flow of gaseous mixture, means for adjusting the degree of opening of said control valve, a shut-off valve for shutting off the flow of the gaseous mixture, and means interconnecting the control valve adjusting means and the shut-off valve, whereby opening of the control valve to a pre-determined degree opens the shut-off valve, and closing of the control valve closes the shut-off valve.

5. In anesthesia apparatus having a casing forming an enclosed chamber adapted to contain a quantity of liquid volatizable anesthetic, means for introducing a carrier gas under pressure into the chamber so as to entrain vaporized anesthetic therein to form a gaseous mixture, valve means to control the flow of the gaseous mixture, and means to discharge the thus controlled gaseous mixture into a breathing circuit for a patient, the improvement which comprises a first shut-off valve interposed in the gas circuit between the source of gas and the chamber, a second shut-off valve interposed between the chamber and the discharge means for the gaseous mixture, and means connecting said two valves so as to open them simultaneously and to close them simultaneously, said connecting means including means for adjusting the degree of opening of the control valve for the gaseous mixture, and means interconnecting the control valve adjusting means and the shut-off valves, whereby opening of the control valve to a predetermined degree opens the shut-off valves, and closing of the control valve closes the shut-off valves, wherein the shut-off valve is disposed laterally of the control valve and has a rotatable valve element, the said interconnecting means comprises a rotatable adjusting stem for the control valve, and the said valve interconnecting means comprises a projecting member on the shut-off valve element disposed eccentrically thereof, and means connected to the adjusting stem of the control valve providing a generally radially projecting arm, the member and arm being so constructed and arranged that during a part revolution of the control valve adjusting stem from its closed position toward its open position the arm engages the member and turns the shut-off valve to open position, and that during the said part revolution of the control valve in the reverse direction toward its closed position the arm engages the member and turns the shut-off valve to closed position.

6. Anesthesia apparatus as claimed in claim 5, wherein the member is a pin affixed to the valve element of the shut-off valve and extending parallel to the pivotal axis thereof, and the arm on the stem of the control valve is disposed in a plane normal to the stem of the control valve, the plane of the arm normally intersecting the pin adjacent the free end of the pin, the leading and trailing edge portions of the arm which engage the pin, and the free end of the pin being so constructed and arranged that the arm on being turned in either direction with the stem of the control valve on its first engagement with the pin first carries the pin with it to turn the valve element of the shut-off valve from one of its terminal positions to the other.

7. In anesthesia apparatus having a casing forming an enclosed chamber adapted to contain a quantity of liquid volatilizable anesthetic, means for introducing a carrier gas under pressure into the chamber so as to entrain vaporized anesthetic therein to form a gaseous mixture, a shut-off valve to open and close the flow of carrier gas through said introducing means into said chamber, conduit means for directing carrier gas and entrained vaporized anesthetic from said chamber to a patient breathing circuit, a control valve in said conduit means for varying the flow of the gaseous mixture from said chamber, means for adjusting the degree of opening of said control valve and means interconnecting the control valve adjusting means and the shut-off valve, operable during an initial part of the operation of said control valve, to open said shut-off valve, and means forming part of said interconnecting means for freeing said control valve for further and independent operation by said control valve adjusting means after said shut-off valve has been opened, whereby said control valve may be operable for varying the flow of said gas mixture beyond a point where said shut-off valve has been fully opened.

8. Anesthesia apparatus as claimed in claim 7 wherein said interconnecting means includes means for reconnecting said control valve adjusting means and said shut-off valve during a part of the movement of said adjusting means as said control valve is moved into closed position.

9. Anesthesia apparatus as claimed in claim 7 wherein said shut-off valve includes valve means for opening and shutting off the path of said gas mixture from said control valve to said patient breathing circuit.

10. In anesthesia apparatus having a casing forming an enclosed chamber adapted to contain a quantity of liquid volatilizable anesthetic, means for introducing a carrier gas under pressure into the chamber so as to entrain vaporized anesthetic therein to form a gaseous mixture, valve means to control the flow of the gaseous mixture, and means to discharge the thus controlled gaseous mixture into a breathing circuit for a patient, the improvement which comprises a first shut-off valve interposed in the gas circuit between the source of gas and the chamber, a second shut-off valve interposed between the chamber and the discharge means for the gaseous mixture, and means connecting said two valves so as to open them simultaneously and to close them simultaneously, wherein said two valves have fixed inlet and exhaust ports disposed close together, and including a single movable valve element having passages therein at least one of which is bordered by an imperforate surface, the passages in said valve element having inlet and outlet ports which communicate with the respective fixed inlet and exhaust ports when the valve element is moved to its open position, at least one of the fixed inlet and exhaust ports of each valve being covered by an imperforate surface portion of the valve element when such element is moved into its closed position, means for adjusting the degree of opening of the control valve for the gaseous mixture, and means interconnecting the control valve adjusting means and the shut-off valves, whereby opening of the control valve to a predetermined degree opens the shut-off valves, and closing of the control valve closes the shut-off valves, and the shut-off valve being disposed laterally of the control valve and having a movable valve element, the said interconnecting means comprising a rotatable adjusting stem for the control valve, and the said valve interconnecting means comprising a projecting member on the shut-off valve element, and means connected to the adjusting stem of the control valve providing a generally radially projecting arm, the member and arm being so constructed and arranged that during the rotation of the control valve adjusting stem from its closed position toward its open position the arm engages the member and moves the shut-off valve to open position, and that during the rotation of the control valve in the reverse direction towards its closed position the arm engages the member and moves the shut-off valve to closed position.

References Cited
UNITED STATES PATENTS

| | | | |
|---|---|---|---|
| 2,915,061 | 12/1959 | Edmondson et al. | 128—188 |
| 3,018,777 | 1/1962 | Dietrich | 128—188 |

FOREIGN PATENTS

| | | |
|---|---|---|
| 648,191 | 1/1951 | Great Britain. |
| 206,898 | 12/1955 | Australia. |

RICHARD A. GAUDET, *Primary Examiner.*

W. E. KAMM, *Assistant Examiner.*

U.S. Cl. X.R.

137—468, 625.17, 625.19, 625.29